Figure 1:
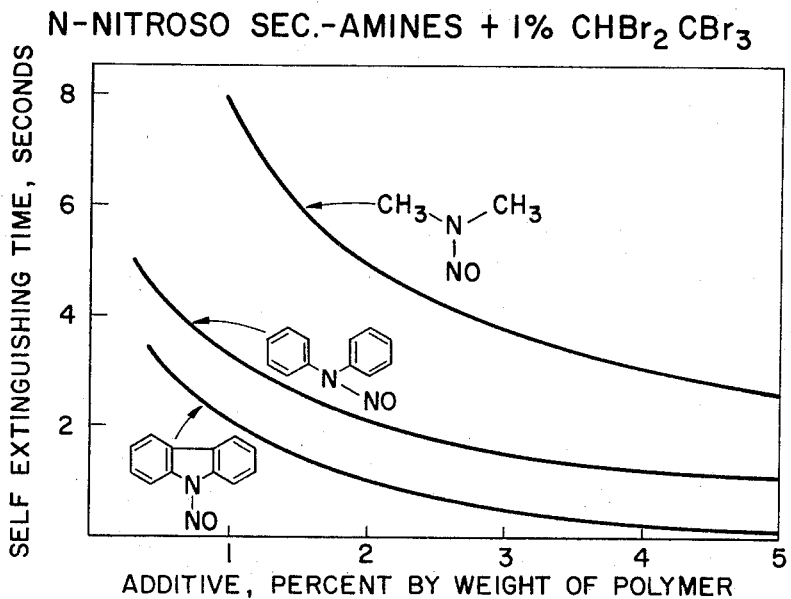

INVENTOR.
ALVIN R. INGRAM

3,274,133
SELF-EXTINGUISHING EXPANDABLE POLYMERS CONTAINING VOLATILE HYDROCARBON, ORGANIC BROMIDE, AND N-NITROSO SECONDARY AMINE
Alvin R. Ingram, Murrysville, Pa., assignor to Koppers Company, Inc., a corporation of Delaware
Filed May 9, 1963, Ser. No. 279,155
7 Claims. (Cl. 260—2.5)

This invention relates to self-extinguishing, flame-retardant polymeric materials. In one specific aspect, it relates to the treatment of vinyl aryl polymers, especially polystyrene or copolymers of styrene, which have been rendered capable of expansion, to impart thereto self-extinguishing properties.

In recent years, workers in the art have strived to produce a polymeric foam which is self-extinguishing or flame-retardant. As a prerequisite for the use of polymeric foam as insulating material in building structures, certain specifications set forth by the Fire Underwriters Laboratories with respect to flame-retardant properties of the foam must be met. Polymeric foams are also used to a considerable extent for making decorative and functional objects for home use. From the standpoint of safety it is extremely desirable that such objects be flame-retardant and self-extinguishing.

By "flame-retardant" I mean that the rate of burning of a particular specimen is considerably slower than the rate of burning of an untreated material. After the flame has been removed from the flame-retardant material, it will cease to burn; i.e., it is self-extinguishing. Self-extinguishing characteristics can be accurately evaluated by methods hereinafter described.

Numerous methods for making self-extinguishing polystyrene foam have been suggested by workers in the art. John J. Tress and William H. Heilman in U.S. 3,050,475 provide a method of making flame-retardant, self-extinguishing styrene polymer by direct bromination of the polymer in the presence of an activating agent, such as a peroxide. Although the Tress et al. method produces a flame-retardant polymer, difficulties arise because of the corrosion problems attributed to the presence of free bromine or free HBR in the final product. In a series of patents, U.S. 3,058,926, 3,058,927, 3,058,928, and 3,058,929, Jacob Eichorn and his co-workers describe the preparation of self-extinguishing polymers by dispersing throughout the polymer a bromine-containing compound as a flame-proofing or flame-retarding agent, in combination with a small amount of an organic peroxide as a synergist. The use of the synergist permits use of the bromine-containing flame-retarding agent in amounts which are substantially smaller than that required for rendering the polymer self-extinguishing in the absence of synergist. This reduction in the required amount of bromine compound not only provides the obvious economic saving, but guards against certain deleterious effects incurred by the presence of too much organic bromide.

I have discovered that certain N-nitroso secondary amines are effective synergists when used in conjunction with a class of organic bromides recognized as self-extinguishing agents for polymers of styrene. These N-nitroso compounds are not self-extinguishing agents per se, nor do they become self-extinguising agents by admixture with known activators, such as peroxides. Most nitroso compounds are ineffective synergists, and exhibit no positive effect in the presence of a known self-extinguishing agent. Surprisingly, I have found a small class of N-nitroso compounds which, when used in conjunction with any of a large class of organic bromides, are remarkably effective synergists. The use of my novel synergistic combination provides an expandable or expanded polymer of styrene having excellent self-extinguishing properties.

It is, therefore, an object of the present invention to provide novel self-extinguishing expandable polymer particles, capable of expansion by conventional means to form self-extinguishing, flame-retardant foam having desirable physical properties.

In accordance with the invention, I have provided a self-extinguishing expandable vinyl aryl polymer; e.g., a polymer of styrene, the polymer having been rendered capable of expansion by the incorporation therein of a volatile aliphatic hydrocarbon boiling in the range of −10 to 81° C., and having dispersed throughout (1) from 0.5–5 percent by weight of an organic bromide having a plurality of bromine atoms attached to the carbon atoms of a radical selected from the group consisting of cyclohexyl and aliphatic radicals, said bromine atoms constituting at least 30 percent by weight of said bromide, and (2) from 0.1 to 3 percent by weight of an N-nitroso secondary amine which evolves a gas at a temperature of 150 to 180° C. when heated in a mixture consisting of nine percent by weight of said N-nitroso secondary amine, five percent by weight pentabromoethane, and 86 percent by weight triethylbenzene.

The polymers useful in preparing the expandable compositions of the invention are the vinyl aryl polymers, particularly polymers of styrene, including polystyrene, or copolymers of styrene and such monomers as butadiene, alpha-methylsytrene, isobutylene, acrylonitrile, acrylic acid, methacrylic acid, and the like.

The preferred polymeric particles used in the invention are commercially available, spherical or irregularly shaped particles ranging in size of, for example, through 6 mesh to on 60 mesh (U.S. sieves).

The organic bromide employed as the self-extinguishing agent in conjunction with the N-nitroso secondary amine synergist is one containing a plurality of bromine atoms in an aliphatic or a cycloaliphatic radical, these bromine atoms constituting at least 30 percent by weight of the organic bromide. Examples of suitable organic bromides are methyl alpha, beta-dibromopropionate, tris(2,3-dibromopropyl)phosphate, carbon tetrabromide, tetrabromoethylene, 1,2 - dibromo - 1,1,2,2 - tetrachloroethane, 1,1,2,2-tetrabromoethane, dibromodichloromethane, 1,2-dibromo-1,1-dichloroethane, 1,2-dibromo-1,2,2-trichloroethane, 1,2,3,4-tetrabromobutane, 1,2,3-tribromopropane, pentabromoethane, hexabromocyclohexane, tribromotrichlorocyclohexane, 1,2,4-tribromobutane, tetrabromopentane, hexabromoethane, tetrabromodichlorocyclohexane, pentabromomonochlorocyclohexane, 1,2-di(dibromomethyl)benzene, and alpha, beta-dibromoethylbenzene. Other useful organic bromides which are somewhat lower in bromine content include brominated styrene-butadiene copolymers containing from 30–40 percent by weight bromine, and brominated hexadecene.

The organic bromide is employed in amounts corresponding to from 0.5 to 5 percent by weight of the polymer, and is used in an amount less than that required to render the polymer self-extinguishing in the absence of synergist. If less than 0.5 percent by weight of bromide is used, the polymer, even in combination with the N-nitroso synergist of the invention, will lack adequate self-extinguishing properties. Excessive amounts of bromine compound have a deleterious effect on the properties of the ultimate polymer. The exact amount used depends upon the bromine content of the particular bromide selected, as well as the choice of N-nitroso synergist and the amount present. In most cases, it is preferable to use between about one and three percent by weight bromine compound based on the weight of the polymer.

The choice of N-nitroso secondary amine synergist for use in the invention is critical. I have discovered that the synergistic effect is not due to the nitroso group alone, but in addition, to the behavior of a particular nitroso compound at different temperature levels. I have found that only those N-nitroso secondary amines characterized by a rapid decomposition range of 150 to 180° C., or preferably 155–172° C., in the presence of an organic bromide are effective as self-extinguishing synergists.

As an accurate method of determining whether a particular N-nitroso compound is useful as a synergist, I devised the following test method: A solution of N-nitroso compound, consisting of nine percent by weight nitroso compound, five percent by weight pentabromoethane, 86 percent by weight triethylbenzene is prepared. The solution is heated in a capillary melting point tube and the temperature at which gases evolve is observed. Those N-nitroso compounds capable of evolving gases within the range of 150 to 180° C., by the Ingram Test Method, are effective synergists for purposes of the invention. In the following table test results for gas evolution are correlated with self-extinguishing properties (determined in the examples that follow) for a number of N-nitroso secondary amines.

TABLE I.—REACTION OF N-NITROSO COMPOUND AND PENTABROMOETHANE IN TRIETHYLBENZENE

| N-Nitroso Compound | Gas Evolution, Temp., °C. | Self-Extinguishing Characteristics |
|---|---|---|
| N,N'-Dinitrosopentamethylenetetramine | 122 | None. |
| N-Nitroso-N-methyl-p-nitrosoaniline | 144 | Do. |
| N-Nitroso-N-benzylaniline | 145 | Do. |
| N-Nitroso-N-phenylaniline | 155 | Good. |
| N-Nitrosocarbazole | 164 | Excellent. |
| N-Nitroso-N-methylaniline | 172 | Do. |
| N-Nitrosopiperidine | 180 | Fair. |
| N-Nitrosodimethylamine | 210 | Poor. |

The results of the Ingram test shown in Table 1 explain the otherwise anomalous behavior of N-nitroso-N-benzylaniline and the closely related N-nitroso-N-phenylaniline and N-nitroso-N-methylaniline. N-nitroso-N-phenylaniline and N-nitroso-N-methylaniline are effective self-extinguishing synergists for use in my invention, whereas the very closely related N-nitroso-N-benzylaniline is completely ineffective because of its low temperature gas evolution, which is indicative of premature reaction in the presence of organic bromide. N-nitroso-N-ethylaniline is included among other useful N-nitroso amines having gas evolution temperatures within the prescribed operable range.

The amount of N-nitroso synergist useful in the invention ranges between 0.1 and three percent by weight, based on the weight of the polymer. At levels below 0.1 percent, the synergistic effect is not significant, and the use of more than three percent by weight causes a marked deterioration of polymer properties. The exact amount to be used varies with the particular N-nitroso compound selected as a synergist.

Figure 2:
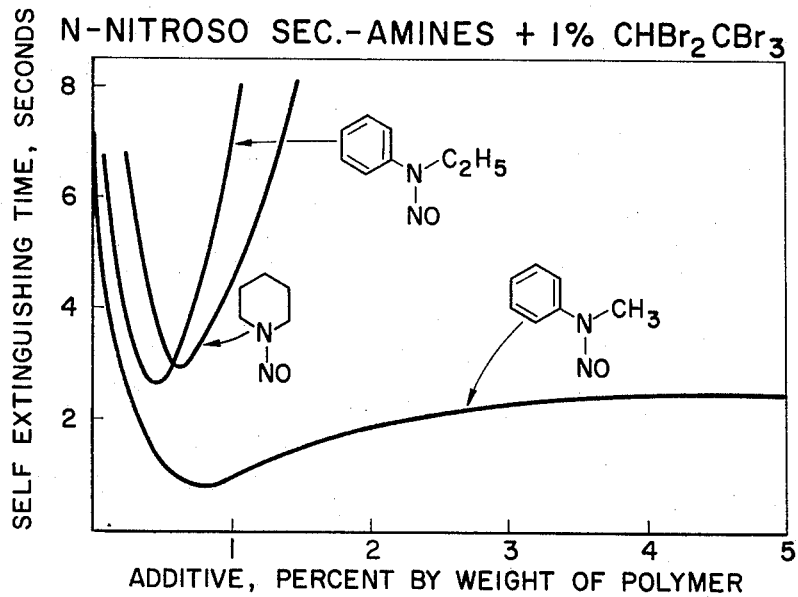

In connection with the amount of synergist used, I have discovered an additional unexpected phenomenon. Certain useful N-nitroso compounds exhibit optimum effective concentrations and others show a progressive increase in effectiveness as the amount of synergist dispersed within the polymer is increased. This phenomenon is more clearly understood with reference to FIGURES 1 and 2 of the accompanying drawing. FIGURE 1 shows the performance of the three N-nitroso secondary amines in combination with one percent by weight, based on the weight of the polymer, of pentabromoethane self-extinguishing agent. With these three compounds, the N-nitroso derivatives of carbazole, diphenylamine and dimethylamine, the self-extinguishing action of pentabromoethane shows a progressive increase in effectiveness as the amount of synergist present is increased. FIGURE 2 shows the unexpected performance under identical test conditions of the N-nitroso derivatives of N-methylaniline, piperidine, and N-ethylaniline. In the case of these three compounds there is a definite optimum amount of N-nitroso compound required to provide effective self-extinguishing action.

The foregoing phenomenon can be explained as follows: The interaction of a nitroso amine and an aliphtic bromine compound causes the evolution of nitrogen, nitric oxide and nitrous oxide. Hydrocarbon-nitric oxide flames are not inhibited by bromides. Thus it is believed that those N-nitroso compounds shown in FIGURE 2 to exhibit optimum concentrations as synergists generated a higher proportion of nitric oxide than the useful N-nitroso compounds shown in FIGURE 1. As the concentration of the N-nitroso compound is increased, the amount of nitric oxide given off is proportionately increased, and at a certain level, completely destroys the self-extinguishing properties of the polymer imparted thereto by the combination of organic bromide and synergist.

As I have noted hereabove, the organic bromide self-extinguishing agent and the N-nitroso synergist can be incorporated into the polymer by post-impregnation of the polymer particles after polymerization is complete, or, alternatively, during a later extrusion and pelletizing operation. If desired, the organic bromide can be added to the monomer prior to polymerization. The N-nitroso compounds act as polymerization inhibitors, and thus must be added at some time after the polymerization is completed.

Conveniently, the fire-retarding bromide and synergist can be added during the incorporation of the volatile aliphatic hydrocarbon, which is best accomplished by the general method described in the D'Alelio patent, supra. By the D'Alelio method a stable aqueous suspension is formed containing the polymer particles and the aliphatic hydrocarbon. Intimate contact is maintained between the hydrocarbon and the polymer, thereby incorporating into the polymer 4.5–9 percent by weight of the hydrocarbon based on the weight of the particles. The suspensions are stabilized by an organic or inorganic suspending agent, such as alkylaryl sulfonates, hydroxyethyl cellulose, polyvinyl alcohol, zinc oxide, calcium carbonate, bentonite, talc, kaolin, calcium phosphate, aluminum oxide, barium sulfate, magnesium carbonate, and the like. Particularly effective are the difficultly soluble phosphates described in U.S. Patent 2,594,913 of J. M. Grim.

Generally, the impregnation of the polymeric particles is accomplished by maintaining the temperature between about 70–120° C. for 1–6 hours. The above-specified amounts of bromide and N-nitroso synergists are added to the suspension or carried into and dispersed throughout the polymer along with the hydrocarbon blowing agent.

After impregnation with the aliphatic hydrocarbon is complete, the polymer particles are de-watered and washed. Generally, if an organic stabilizing agent is used in the suspension, a water wash is sufficient. If an inorganic dispersant, such as calcium phosphate, is used, the polymer suspension is adjusted to the pH below about 1.8 by the addition of strong concentrated mineral acid, e.g., HCl or $HNO_3$ A water wash is then used to remove free acid from the polymer particles.

The polymer particles are dried at ambient or at slightly elevated temperatures. The particles may be simply spread on a flat surface and allowed to dry at room temperature until they are free-flowing. In commercial practice, expandable polymeric particles are placed in a forced circulation oven for from 10 to 20 minutes at about 90–130° F. Drying time and temperature vary with the degree of air circulation achieved in the oven and the thickness of the particle layer to be dried. Care is taken to avoid any substantially volatilization of the aliphatic hydrocarbon within the particles.

In the co-pending application of Carl Pottenger, S.N. 21,611, filed April 14, 1960, there is described a method of making pellets from vinyl aryl polymer beads by direct injection of the hydrocarbon blowing agent into the barrel of an extruder. As I have mentioned above, this technique is also applicable to the preparation of the compositions of my invention. The organic bromide and N-nitroso synergist can be added, either with or without the pentane, directly to an extruder in the prescribed amounts. The mixing accomplished along the barrel of the extruder is sufficient to provide an homogeneous dispersion of flame-retarding agent and synergist within the polymer particles.

The novel self-extinguishing expandable particles of the invention may be heated directly using conventional means to make a low density foam, i.e., one having a density of less than three lbs. per cubic foot, or they may be stored or sold to foam producers. The particles may also be partially expanded to produce an integral, free-flowing, low density product from which only a portion of the aliphatic hydrocarbon has been volatilized. Such partially expanded particles are quite suitable for molding purposes. The partial volatilization may be accomplished by heating using steam, hot water, infrared or radio frequency means. The pre-expanded particles may be stored or sold as such. They are further expanded by the application of heat in the manner hereinbefore described to make an integral, low density, self-extinguishing foam.

The self-extinguishing properties of the composition of the invention are evaluated by foaming the compositions in a mold in the conventional manner and cutting the molded specimens into strips 5″ x 1″ x ½″. The strips are mounted vertically and flame is applied to the lower end of the strip. The time required for flame-out, in seconds, is the measure of the self-extinguishing characteristics of the product foam.

An alternative method of determining self-extinguishing characteristics involves forming dry castings of dense foam from solutions of polystyrene and methyl chloride. Test specimens are made by dissolving 5 g. polystyrene foam particles in 20 ml. of methyl chloride and foaming castings in an air stream. The plate-like specimens of dense irregular foam are mounted in a vertical plane throughout the edge and contacted for three seconds with a ½ inch yellow flame of a micro burner, measuring the time for the flame to be extinguished by a stop watch. Any foam requiring more than 15 seconds for flame-out is considered non-self-extinguishing. A self-extinguishing time of 8–10 seconds is considered poor; 4–8 seconds, fair; 2–4 seconds, good; and below 2 seconds, excellent. It is seen from FIGURES 1 and 2 that the synergists of the invention, when used in the prescribed amounts, provide foams having good to excellent self-extinguishing characteristics.

My invention is further illustrated by the following examples:

*Example I*

Styrene was polymerized in suspension to at least 99.7 percent conversion. The polymer was obtained in the form of spheres, predominently through 10 to on 30 mesh (U.S. sieves). The spheres were impregnated with pentane in aqueous suspension by the method of D'Alelio, hereinbefore described. The expandable particles thus obtained were pre-expanded by steam in the conventional manner. A series of test castings were made by dissolving 5 g. of polystyrene foam particles in 20 ml. of methyl chloride containing 1 percent pentabromoethane, based on the weight of the polymer. The castings were foamed in an air stream and the resulting plate-like specimens of dense irregular foam were mounted in a vertical plane throughout the edge and contacted for three seconds with a yellow flame of a micro burner. The time for the flame to be extinguished was measured by a stop watch. Test results are shown in Table II.

TABLE II

| Test | Percent Organic Bromide | Percent N-Nitroso Compound | Flame-Out, sec.[a] |
| --- | --- | --- | --- |
| A | 1.0 | 5.0 | 0.2 |
| B | 1.0 | 3.0 | 0.2 |
| C | 1.0 | 2.0 | 0.2 |
| D | 1.0 | 1.0 | 2.8 |
| E | 1.0 | 0.5 | 3.0 |
| F | 1.0 | 0.0 | [b] Not SE |

[a] Average for 5 specimens.
[b] Self-Extinguishing.

It is seen that N-nitrosocarbazole is an excellent self-extinguishing synergist when present in concentrations in slight excess of one percent, and is effective at concentrations as low as 0.5 percent.

The composition of Test C of this example was formulated using tris(2,3-dibromopropyl)phosphate in lieu of the one percent pentabromoethane. The resulting foam had an average self-extinguishing time of 2.8 seconds.

*Example II*

The procedure of Example I was substantially repeated using pentabromoethane as the organic bromide and N-nitrosodiphenylamine as the synergist. The results are shown in Table III.

TABLE III

| Test | Percent Organic Bromide | Percent N-Nitroso Compound | Flame-Out, sec. |
| --- | --- | --- | --- |
| A | 1.25 | 2.0 | 1.6 |
| B | 1.25 | 1.5 | 1.0 |
| C | 1.25 | 1.0 | 1.4 |
| D | 1.25 | 0.5 | 1.8 |
| E | 1.00 | 5.0 | 1.4 |

It is seen that N-nitrosodiphenylamine provides a foam having excellent self-extinguishing qualities.

*Example III*

The procedure of Example I was substantially repeated using pentabromoethane as the organic bromide and N-nitrosopiperidine as the synergist. The results are shown in Table IV.

TABLE IV

| Test | Percent Organic Bromide | Percent N-Nitroso Compound | Flame-Out, sec. |
| --- | --- | --- | --- |
| A | 1.0 | 5.0 | Not SE |
| B | 1.0 | 1.0 | 3.8 |
| C | 1.0 | 0.7 | 4.0 |
| D | 1.0 | 0.5 | 3.4 |
| E | 1.0 | 0.3 | 5.8 |

It is seen that N-nitrosopiperidine provides a foam having good self-extinguishing characteristics and that the foam exhibits such characteristics only at optimum concentrations of synergist.

*Example IV*

The procedure of Example I was substantially repeated using pentabromoethane as the organic bromide and N-nitroso-N-ethylaniline as the synergist. The results are shown in Table V.

TABLE V

| Test | Percent Organic Bromide | Percent N-Nitroso Compound | Flame-Out, sec. |
|---|---|---|---|
| A | 1.0 | 5.0 | Not SE |
| B | 1.0 | 1.0 | 6.4 |
| C | 1.0 | 0.7 | 5.0 |
| D | 1.0 | 0.5 | 2.6 |
| E | 1.0 | 0.3 | 3.6 |

It is seen that N-nitroso-N-ethylaniline provides a foam having good self-extinguishing qualities.

*Example V*

The procedure of Example I was substantially repeated using pentabromoethane as the organic bromide and N-nitroso-N-methylaniline as the synergist. The results are shown in Table VI.

TABLE VI

| Test | Percent Organic Bromide | Percent N-Nitroso Compound | Flame-Out, sec. |
|---|---|---|---|
| A | 1.0 | 5.0 | 2.8 |
| B | 1.0 | 5.0 | 2.2 |
| C | 1.0 | 3.0 | 2.2 |
| D | 1.0 | 3.0 | 2.4 |
| E | 1.0 | 1.5 | 2.4 |
| F | 1.0 | 1.0 | 1.0 |
| G | 1.0 | 0.5 | 1.2 |
| H | 1.0 | 0.5 | 1.4 |
| I | 1.0 | 0.4 | 2.8 |
| J | 1.0 | 0.3 | 1.8 |
| K | 1.0 | 0.2 | 3.0 |
| L | 1.0 | 0.1 | 6.0 |
| M | 1.0 | 0.0 | >10 |

It is seen that N-nitroso-N-methylaniline provides a foam having excellent self-extinguishing qualities.

*Example VI*

The procedure of Example I was substantially repeated using pentabromoethane as the organic bromide and N-nitrosodimethylamine as the synergist. The results are shown in Table VII.

TABLE VII

| Test | Percent Organic Bromide | Percent N-Nitroso Compound | Flame-Out, sec. |
|---|---|---|---|
| A | 1.0 | 5.0 | 2.2 |
| B | 1.0 | 4.0 | 3.0 |
| C | 1.0 | 3.0 | 2.8 |
| D | 1.0 | 2.0 | 7.8 |
| E | 1.0 | 1.0 | 8.0 |
| F | 1.0 | 0.0 | >10 |

It is seen that N-nitrosodimethylamine provides a foam having good self-extinguishing properties, but only when used in such concentrations as are marginal or definitely harmful in their effect on polymer properties.

*Example VII*

The procedure of Example I was repeated using one percent pentabromoethane and concentrations of 5 percent, 1.7 percent, and 0.3 percent N-nitroso-N-methyl-p-nitrosoaniline. The resulting foam was not self-extinguishing, as is shown in Table VIII.

TABLE VIII

| Test | Percent Organic Bromide | Percent N-Nitroso Compound | Flame-Out, sec. |
|---|---|---|---|
| A | 1.0 | 5.0 | Not SE. |
| B | 1.0 | 1.7 | Not SE. |
| C | 1.0 | 0.3 | Not SE. |

*Example VIII*

The procedure of Example I was repeated using one percent pentabromoethane as the organic bromide and 5 percent N-Nitroso-N-methyl-p-nitrosoaniline as the synergist. The results are shown in Table IX.

TABLE IX

| Test | Percent Organic Bromide | Percent N-Nitroso Compound | Flame-Out, sec. |
|---|---|---|---|
| A | 1.0 | 5.0 | Not SE. |

*Example IX*

The procedure of Example I was repeated using one percent pentabromoethane as the organic bromide and N-nitrosomethylurea as the synergist. The results are shown in Table X.

TABLE X

| Test | Percent Organic Bromide | Percent N-Nitroso Compound | Flame-Out, sec. |
|---|---|---|---|
| A | 1.0 | 5.0 | Not SE. |

*Example X*

The procedure of Example I was repeated using one percent pentabromoethane as the organic bromide and N-nitroso-N-methylurethane as the synergist. The results are shown in Table XI.

TABLE XI

| Test | Percent Organic Bromide | Percent N-Nitroso Compound | Flame-Out, sec. |
|---|---|---|---|
| A | 1.0 | 5.0 | Not SE. |

*Example XI*

The procedure of Example I was repeated using one percent pentabromoethane as the organic bromide and N-nitroso-p-toluenesulfomethylamide as the synergist. The results are shown in Table XII.

TABLE XII

| Test | Percent Organic Bromide | Percent N-Nitroso Compound | Flame-Out, sec. |
|---|---|---|---|
| A | 1.0 | 5.0 | Not SE. |

*Example XII*

The procedure of Example I was repeated using one percent pentabromoethane as the organic bromide and N-nitroso-*beta*-ethylaminoisobutylmethyl ketone as the synergist. The results are shown in Table XIII.

TABLE XIII

| Test | Percent Organic Bromide | Percent N-Nitroso Compound | Flame-Out, sec. |
|---|---|---|---|
| A | 1.0 | 5.0 | Not SE. |

*Example XIII*

The procedure of Example I was repeated using one percent pentabromoethane as the organic bromide and p-nitrosodiphenylamine as the synergist. The results are shown in Table XIV.

TABLE XIV

| Test | Percent Organic Bromide | Percent N-Nitroso Compound | Flame-Out, sec. |
|---|---|---|---|
| A | 1.0 | 5.0 | Not SE. |

It is seen from Examples VII to XIII that the nitroso group is not in itself responsible for the action of nitroso compounds as self-extinguishing synergists. The failure of the compounds tested in these examples is explained in the discussion concerning the gas evolution test.

*Example XIV*

Compositions containing the N-nitroso synergist of Example V were made for testing the self-extinguishing properties of low density foam. The compositions were made as follows: Styrene was polymerized in a two percent solution of tris(2,3-dibromopropyl)phosphate and styrene to at least 99.7 percent conversion. The suspension of spherical particles was divided into five portions. To each of the portions was added a solution of N-nitroso-N-methylaniline in pentane, the concentration of N-nitrosocompound varying as indicated in the table hereunder. The pentane added to the suspension corresponded to 8.5 percent by weight, based on the weight of the polymer. The mixtures were sealed in bottles and rotated end over end for six hours at 90° C. The resulting beads were pre-expanded by steam and the pre-expanded product was molded into 5 x 5 x ⅜″ specimens. Strips of ½-inch width were conditioned for six hours in vacuo at 60° C. to remove pentane and water. Vertically mounted strips were ignited by yellow flame until the bottom ¼-inch portion disappeared. The results are shown in Table XV.

TABLE XV

| Test | Percent Organic Bromide | Percent N-Nitroso Compound | Inches Burned | Flame-Out, sec. |
|---|---|---|---|---|
| A | 2.0 | 0.00 | | Not SE |
| B | 2.0 | 0.25 | 2.4 | 9.6 |
| C | 2.0 | 0.50 | 2.0 | 6.4 |
| D | 2.0 | 1.00 | 1.2 | 2.6 |
| E | 2.0 | 2.0 | 1.4 | 2.0 |

I claim:
1. A self-extinguishing expandable polymer of styrene, having been rendered capable of expansion by the incorporation therein of a volatile aliphatic hydrocarbon boiling in the range of −10 to 81° C. and having dispersed throughout (1) from 0.5 to 5 percent by weight of an organic bromide having a plurality of bromine atoms attached to carbon atoms of a radical selected from the group consisting of cyclohexyl and aliphatic radicals, said bromine atoms constituting at least 30 percent by weight of said bromide (2) and from 0.1 to 3 percent by weight of an N-nitroso secondary amine which evolves gas at a temperature of 150—180° C. when heated in a mixture consisting of 9 percent by weight of said N-nitroso secondary amine, 5 per cent by weight pentabromoethane and 86 percent by weight triethylbenzene.

2. A self-extinguishing expandable polymer of styrene, having been rendered capable of expansion by the incorporation therein of a volatile aliphatic hydrocarbon boiling in the range of −10 to 81° C. and having dispersed throughout (1) from 1 to 3 percent by weight of an organic bromide having a plurality of bromine atoms attached to carbon atoms of a radical selected from the group consisting of cyclohexyl and aliphatic radicals, said bromine atoms constituting at least 30 percent by weight of said bromide (2) and from 0.1 to 3 percent by weight of an N-nitroso secondary amine which evolves gas at a temperature of 150–180° C. when heated in a mixture consisting of 9 percent by weight of said N-nitroso secondary amine, 5 percent by weight pentabromoethane and 86 percent by weight triethylbenzene and which is selected from the group consisting of N-nitrosocarbazole, N-nitrosodiphenylamine, N-nitroso-N-methylaniline, N-nitroso-N-ethylaniline, and N-nitrosopiperidine.

3. Expandable polystyrene containing 4–9 percent by weight aliphatic hydrocarbon boiling in the range of −10 to 81° C., 1–3 percent by weight tris(2,3-dibromopropyl)phosphate and 0.5–3 percent by weight N-nitrosocarbazole.

4. Expandable polystyrene containing 4–9 percent by weight aliphatic hydrocarbon boiling in the range of −10 to 81° C., 1–3 percent by weight tris(2,3-dibromopropyl)phosphate and 0.5–3 percent by weight N-nitrosodiphenylamine.

5. Expandable polystyrene containing 4–9 percent by weight aliphatic hydrocarbon boiling in the range of −10 to 81° C., 1–3 percent by weight tris(2,3-dibromopropyl)phosphate and 0.2–3 percent by weight N-nitroso-N-methylaniline.

6. Expandable polystyrene containing 4–9 percent by weight aliphatic hydrocarbon boiling in the range of −10 to 81° C., 1–3 percent by weight tris(2,3-dibromopropyl)phosphate and 0.5–1 percent by weight N-nitrosopiperidine.

7. Expandable polystyrene containing 4–9 percent by weight aliphatic hydrocarbon boiling in the range of −10 to 81° C., 1–3 percent by weight tris(2,3-dibromopropyl)phosphate and 0.3–0.7 percent by weight N-nitroso-N-ethylaniline.

References Cited by the Examiner

FOREIGN PATENTS 568,164  12/1958  Canada.

OTHER REFERENCES

Eichhorn: "Synergism of Free Radical Initiators With Self-Extinguishing Additives in Vinyl Aromatic Polymers," Journal of Applied Polymer Science, vol. 8, pp. 2497–2524 (1964).

MURRAY TILLMAN, *Primary Examiner.*

N. F. OBLON, *Assistant Examiner.*